United States Patent
Kitani et al.

(10) Patent No.: US 11,299,112 B2
(45) Date of Patent: Apr. 12, 2022

(54) AUTONOMOUS DRIVING SYSTEM, AUTONOMOUS DRIVING CONTROL METHOD, DATA ECU, AND AUTONOMOUS DRIVING ECU

(71) Applicant: HITACHI AUTOMOTIVE SYSTEMS, LTD., Hitachinaka (JP)

(72) Inventors: Mitsuhiro Kitani, Tokyo (JP); Hidetoshi Teraoka, Tokyo (JP); Kohei Sakurai, Hitachinaka (JP); Kenichi Osada, Hitachinaka (JP); Mikio Kataoka, Hitachinaka (JP)

(73) Assignee: HITACHI ASTEMO, LTD., Hitachinaka (JP)

( * ) Notice: Subject to any disclaimer, the term of this patent is extended or adjusted under 35 U.S.C. 154(b) by 0 days.

(21) Appl. No.: 15/766,390

(22) PCT Filed: Sep. 7, 2016

(86) PCT No.: PCT/JP2016/076225
§ 371 (c)(1),
(2) Date: Apr. 6, 2018

(87) PCT Pub. No.: WO2017/064944
PCT Pub. Date: Apr. 20, 2017

(65) Prior Publication Data
US 2018/0304828 A1 Oct. 25, 2018

(30) Foreign Application Priority Data

Oct. 16, 2015 (JP) .............................. JP2015-204170

(51) Int. Cl.
*B60R 16/023* (2006.01)
*B60W 50/00* (2006.01)
(Continued)

(52) U.S. Cl.
CPC ........... *B60R 16/023* (2013.01); *B60W 50/00* (2013.01); *B60W 50/0098* (2013.01);
(Continued)

(58) Field of Classification Search
None
See application file for complete search history.

(56) References Cited

U.S. PATENT DOCUMENTS

| 8,509,982 B2* | 8/2013 | Montemerlo | ...... G06K 9/00805 |
| | | | 701/26 |
| 9,690,290 B2* | 6/2017 | Prokhorov | ........... G05D 1/0011 |

(Continued)

FOREIGN PATENT DOCUMENTS

| DE | 10 2004 008 910 A1 | 9/2005 |
| DE | 10 2007 013 511 A1 | 9/2008 |

(Continued)

OTHER PUBLICATIONS

Liu, "Vision-based long-distance perception and front vehicle location for full autonomous vehicles on highway roads", 2012, Springer, J. Cent. South Univ., 19, 1454-1465 (Year: 2012).*

(Continued)

*Primary Examiner* — Yuen Wong
*Assistant Examiner* — Hongye Liang
(74) *Attorney, Agent, or Firm* — Mattingly & Malur, PC

(57) ABSTRACT

The autonomous driving ECU includes a first communication unit that transmits and receives autonomous driving data to and from the plurality of data ECUs, and a vehicle control unit that controls a vehicle on the basis of the autonomous driving data transmitted from the plurality of data ECUs. Each data ECU includes a data construction unit that performs a construction of the autonomous driving data transmitted to the autonomous driving ECU, and a second communication unit that transmits and receives the autono- (Continued)

mous driving data to and from the autonomous driving ECU. If a predetermined event occurs, among the data ECUs, the data construction unit of the data ECU in which the predetermined event occurs constructs the autonomous driving data so that a total amount of the autonomous driving data transmitted from the data ECU in which the predetermined event occurs is not greater than a predetermined amount of data.

13 Claims, 11 Drawing Sheets

(51) Int. Cl.
| | |
|---|---|
| *B60W 50/06* | (2006.01) |
| *B60W 50/02* | (2012.01) |
| *B60W 50/023* | (2012.01) |
| *G05D 1/00* | (2006.01) |
| *H04L 67/12* | (2022.01) |
| *H04L 12/40* | (2006.01) |

(52) U.S. Cl.
CPC ...... *B60W 50/023* (2013.01); *B60W 50/0205* (2013.01); *B60W 50/06* (2013.01); *G05D 1/0088* (2013.01); *H04L 67/12* (2013.01); *B60W 2050/0006* (2013.01); *H04L 2012/40215* (2013.01); *H04L 2012/40273* (2013.01)

(56) References Cited

U.S. PATENT DOCUMENTS

| | | | |
|---|---|---|---|
| 9,915,950 B2* | 3/2018 | Hartung | G05D 1/021 |
| 2003/0018422 A1* | 1/2003 | Akiyama | B60R 16/0315 |
| | | | 701/48 |
| 2003/0076221 A1* | 4/2003 | Akiyama | H04L 12/40182 |
| | | | 340/12.32 |
| 2006/0173614 A1* | 8/2006 | Nomura | G01C 21/32 |
| | | | 701/425 |
| 2007/0076593 A1* | 4/2007 | Sakurai | B60W 50/0205 |
| | | | 370/219 |
| 2007/0286225 A1 | 12/2007 | Enders et al. | |
| 2015/0158499 A1* | 6/2015 | Koravadi | B60T 7/18 |
| | | | 701/23 |
| 2015/0256356 A1 | 9/2015 | Armbruster et al. | |

FOREIGN PATENT DOCUMENTS

| | | |
|---|---|---|
| DE | 10 2011 117 116 A1 | 5/2013 |
| DE | 10 2012 219 176 A1 | 4/2014 |
| JP | 2003-191804 A | 7/2003 |
| JP | 2014-118072 A | 6/2014 |

OTHER PUBLICATIONS

International Search Report of PCT/JP2016/076225 dated Dec. 20, 2016.

German Office Action received in corresponding German Application No. 11 2016 004 174.8 dated Jun. 18, 2021.

\* cited by examiner

FIG.1
(a)
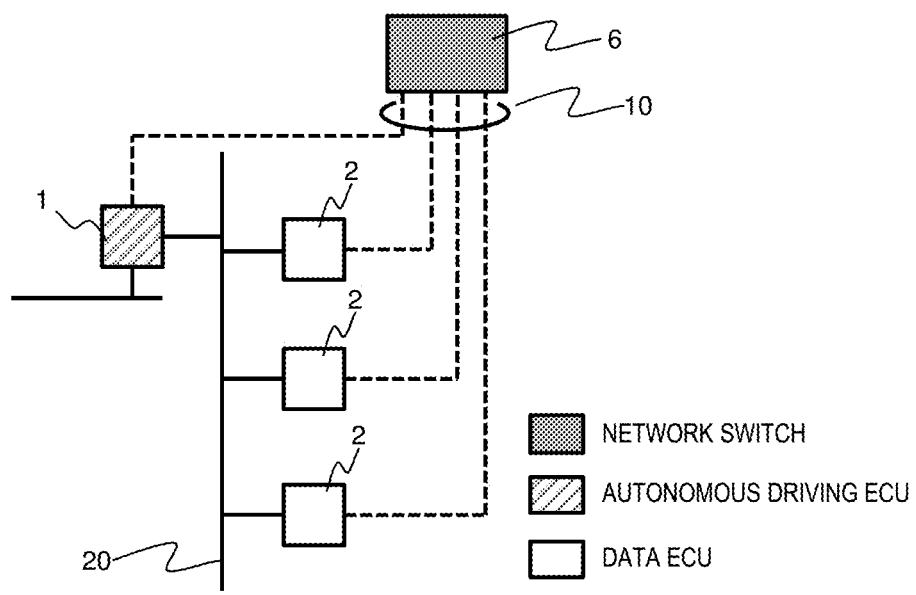
(b)
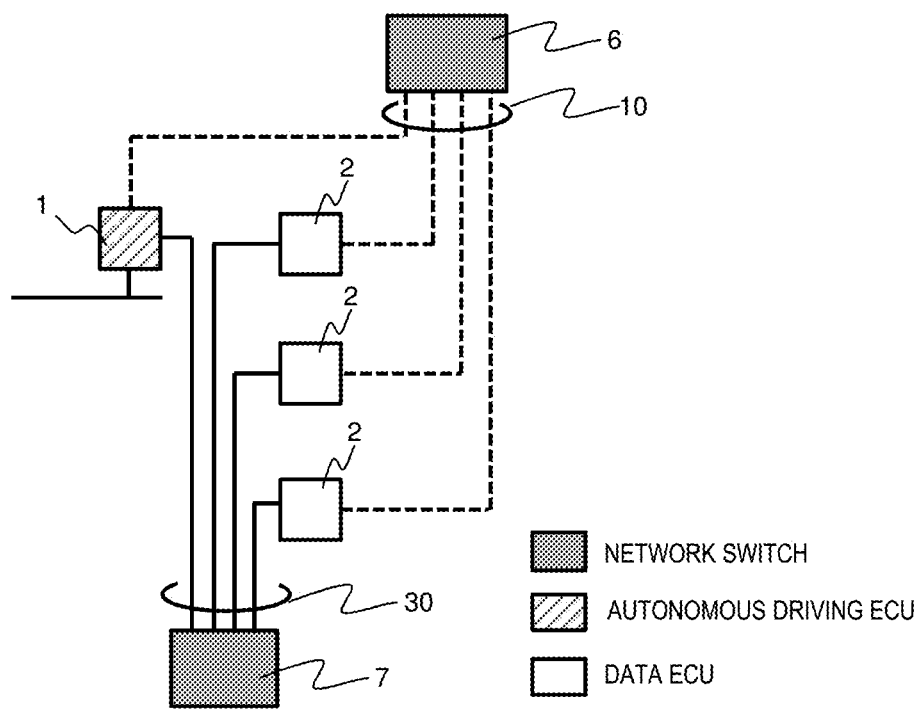

FIG. 5
(a)
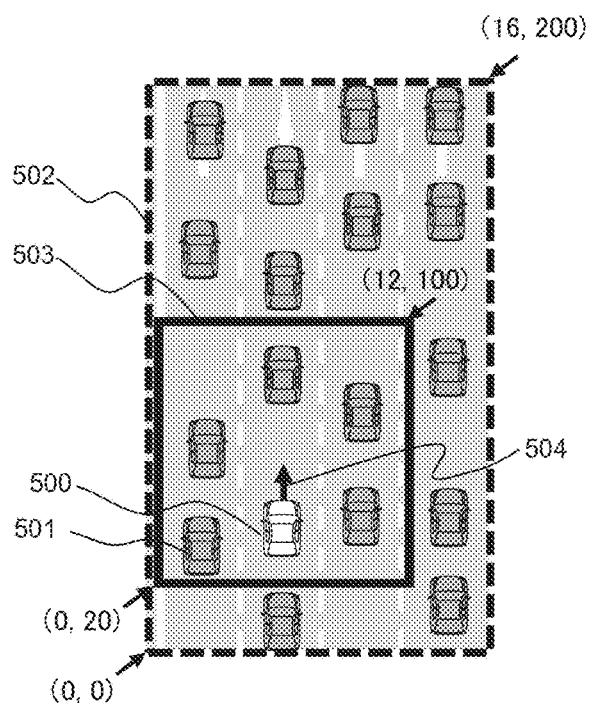
(b)
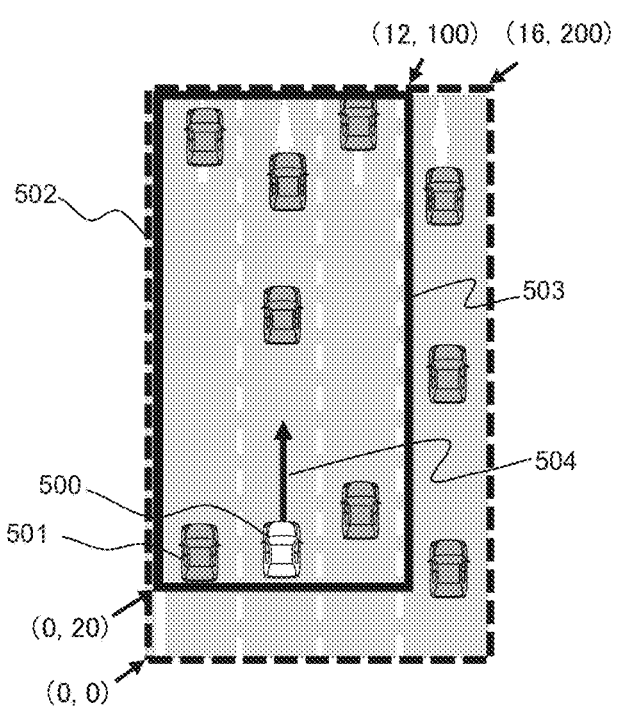

FIG. 6
(a)
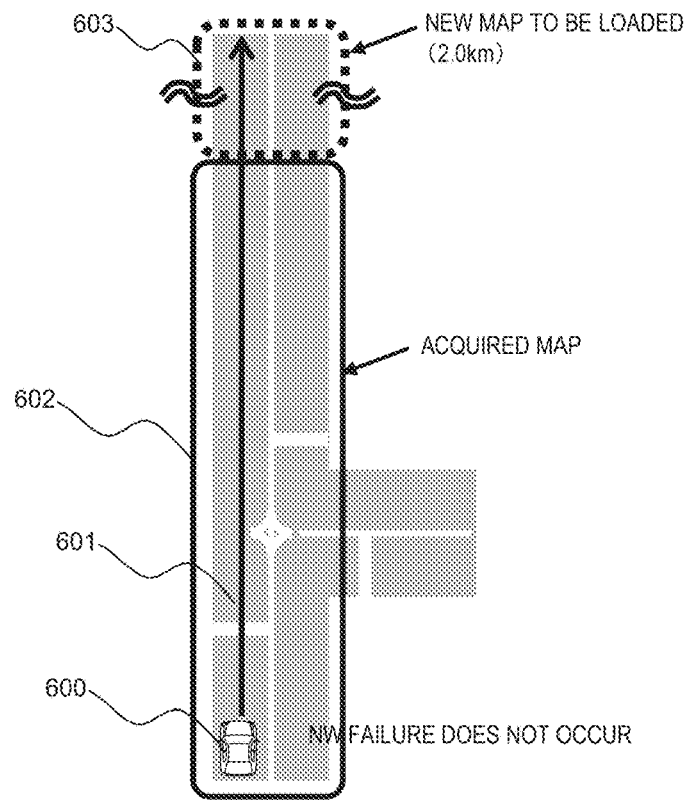
(b)
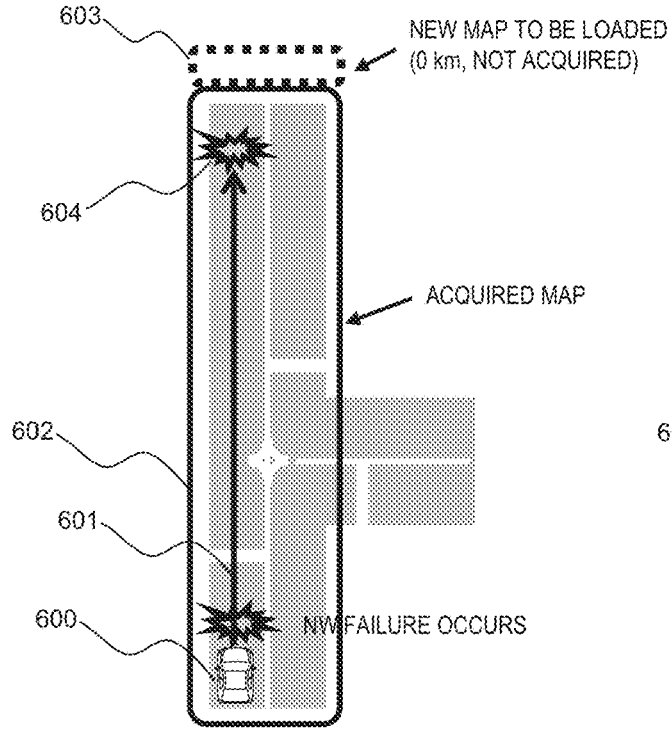
(c)
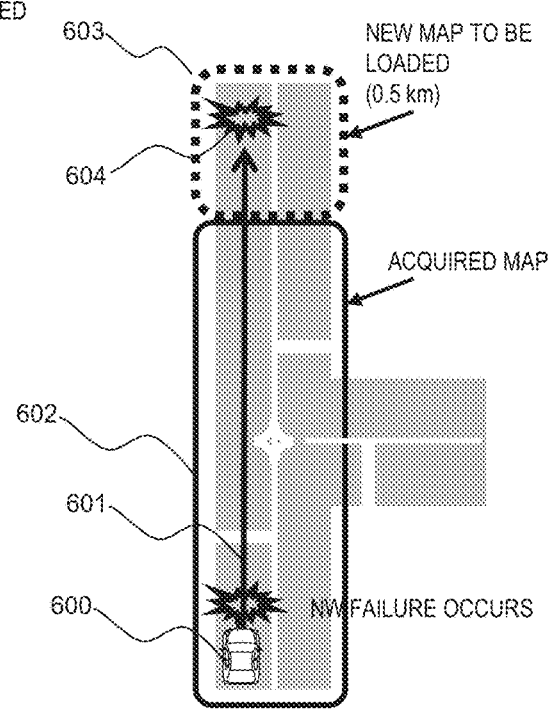

FIG. 7
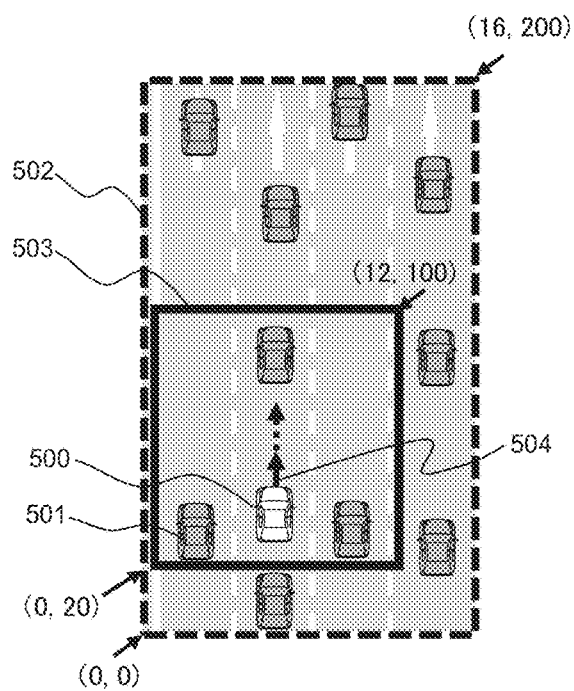
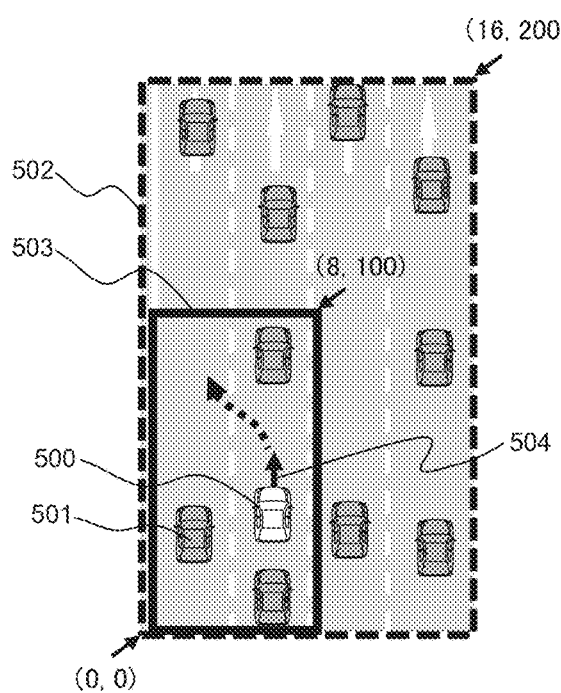 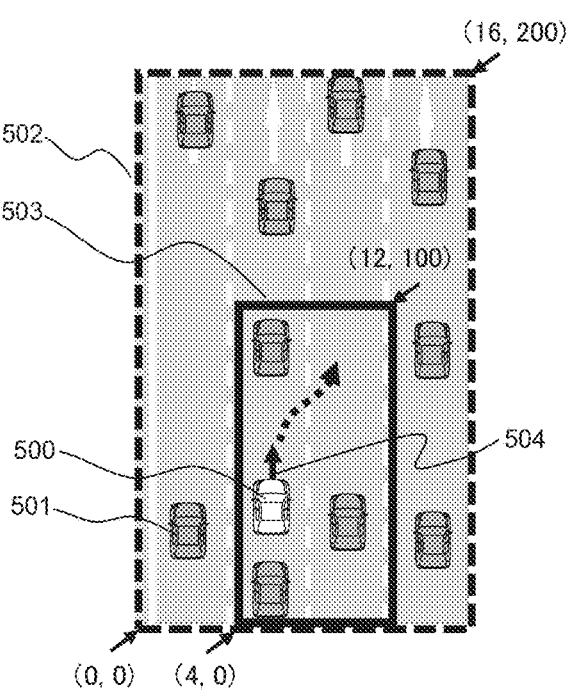

AUTONOMOUS DRIVING SYSTEM, AUTONOMOUS DRIVING CONTROL METHOD, DATA ECU, AND AUTONOMOUS DRIVING ECU

TECHNICAL FIELD

The present invention relates to an onboard system to which an onboard dedicated electronic control device and a plurality of electronic control devices are connected through an onboard network.

BACKGROUND ART

In recent years, according to enhancement in an automobile function, digitalizing a vehicle has progressed, the number of vehicle Electronic Control Units (ECUs), and the amount of information transmitted between the ECUs has increased. Henceforth, by realization and evolution of the autonomous driving function, it has been considered that the number of sensors such as a camera or a radar which is required to grasp a situation of the vicinity of a vehicle has increased. Therefore, a CPU processing load for processing sensing data which is output from a sensor, and a load of a network transmission path between the sensor and the ECU or between the ECUs has increased. Since a CPU performance or a network bandwidth is finite, it is important to reduce the amount of data of the above described sensing data.

PTL 1 discloses a technique in which a communication bandwidth is suppressed by reducing data exchanged between ECUs when an event (network failure) occurs. A communication system disclosed in PTL 1 connects control unit each other by CAN buses of two systems for a main use and a backup use, first data (driving use data+pleasantness improvement data) which is classified in advance is transmitted and received by the CAN bus for the main use and second data (driving use data) of which an amount of data is less than that of the first data is transmitted and received by the CAN bus for the backup use. In addition, when a breakdown of any of the CAN buses of the two systems is detected, transmission and reception are performed by using only a normal CAN bus, and thus at least the data for driving is able to be surely transmitted and received.

CITATION LIST

Patent Literature

PTL 1: JP-A-2014-118072

SUMMARY OF INVENTION

Technical Problem

The onboard system disclosed in PTL 1 uniformly reduces data transmitted from all the ECUs, but there is a desire to flexibly reduce according to a situation. For example, in an autonomous driving system, reducing data is necessary according to various situations such as the type of roads, a time slot, the climate, and the volume of traffic.

Solution to Problem

The present application includes a plurality of means for resolving the above problems, but for example, as disclosed in claims, an autonomous driving system in which an autonomous driving ECU and a plurality of data ECUs are connected with each other through a first network is configured. The autonomous driving ECU includes a first communication unit that transmits and receives autonomous driving data to and from the plurality of data ECUs, and a vehicle control unit that controls a vehicle on the basis of the autonomous driving data transmitted from the plurality of data ECUs. Each of the data ECUs includes a data construction unit that performs a construction of the autonomous driving data transmitted to the autonomous driving ECU, and a second communication unit that transmits and receives the autonomous driving data to and from the autonomous driving ECU. In a case in which a predetermined event occurs, among the plurality of data ECUs, the data construction unit of the data ECU in which the predetermined event occurs constructs the autonomous driving data so that a total amount of the autonomous driving data transmitted from the data ECU in which the predetermined event occurs is not greater than a predetermined amount of data.

Advantageous Effects of Invention

It is possible to flexibly reduce an amount of data processed by an onboard electronic control device, and a communication amount of data transmitted and received between onboard electronic control devices.

BRIEF DESCRIPTION OF DRAWINGS

FIG. 1 The entire configuration of an autonomous driving system and a network topology according to the present invention.

FIG. 5 An example of a method of reducing information on autonomous driving data.

FIG. 6 An example of a method of reducing information on autonomous driving data.

FIG. 7 An example of a method of reducing information on autonomous driving data.

DESCRIPTION OF EMBODIMENTS

Figure 2:
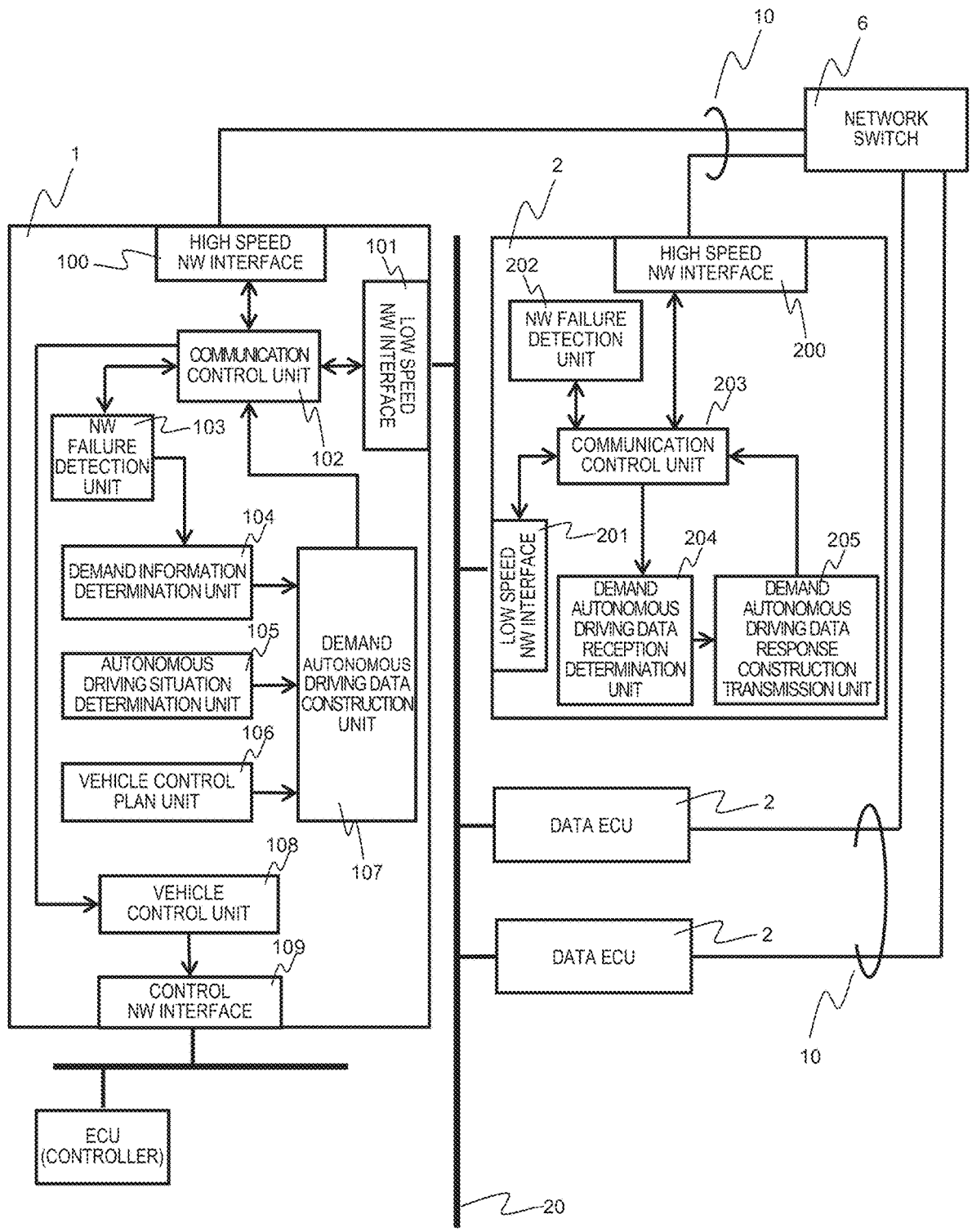
FIG. 2 A configuration of an autonomous driving ECU and a data ECU according to Example 1.

Hereinafter, an example of the present invention is described with reference to drawings. In addition, the same numeral is written for the same elements and processing contents and descriptions thereof are omitted.

Example 1

In Example 1, a configuration of a device, and a method for dynamically reducing information transmitted from a data ECU to the autonomous driving ECU, on the basis of a request instruction from the autonomous driving ECU to the data ECU at the time of a network failure occurrence as one of an event which becomes a trigger for reducing data, are described by using FIG. 1 to FIG. 7.

In addition, an onboard use network uses a network which complies with a standard, such as Controller Area Network (CAN, registered trademark), a Local Interconnect Network (LIN), a FlexRay, a Media Oriented Systems Transport (MOST), and Ethernet (registered trademark) in many cases, but the present example is not limited thereto.

<Network Configuration>

FIG. 1 is a diagram illustrating an example of a configuration of a network through which each of ECUs is connected.

(a) of FIG. 1 configures a main use communication path with a star type network, and a backup use communication path with a bus type network. (a) of FIG. 1 is configured with an autonomous driving ECU 1, a data ECU 2, a network switch 6, a main use network 10, and a backup use network 20.

The autonomous driving ECU 1 calculates a control signal related to a driving control of a vehicle, for a high degree of support system or an autonomous driving system, by using external recognition information which specifies various objects (a sign, a landmark, a vehicle, a pedestrian, a movable body, an obstacle, and the like) around a host vehicle based on information on a sensor such as a camera or a radar, host vehicle position information with high precision calculated on the basis of Global Positioning System (GPS) information and driving related information on the host vehicle such as an acceleration and a rudder angle, map information with high precision for performing an autonomous driving such as an autonomous driving or a remote operation driving, and the like.

The data ECU 2 calculates and transmits the above described external recognition information, the host vehicle position information with high precision, or the map information with high precision, to the autonomous driving ECU 1.

The calculation processing of information (hereinafter, referred to as autonomous driving data) such as the external recognition information, the host vehicle position information with high precision, or the map information with high precision, which is required to the autonomous driving may be performed by a plurality of data ECUs 2 by assigning a part of the calculation processing to each of the plurality of data ECUs 2, and may be performed by the plurality of data ECUs 2 by cooperating the calculation processing.

In addition, a part or the entire of the calculation processing may be combined in the autonomous driving ECU 1. Further, basically, a transmission demand of the autonomous driving data from the autonomous driving ECU 1 to the data ECU 2 is not issued, and the autonomous driving data is transmitted from the data ECU 2 to the autonomous driving ECU 1 in a regular period.

The network switch 6 is a switch device for connecting the autonomous driving ECU 1 with the data ECU 2 by a star type network. An object of the present device is to perform a relay of data between a plurality of transmission paths, and the present device may be a device such as a switching hub, a router, and a gateway.

The main use network 10 is a transmission path for configuring a star type network, and for example, complies with an onboard use Ethernet.

The backup use network 20 is a transmission path for configuring a bus type network, and for example, complies with a CAN or a Controller Area Network-Flexible Data rate (CAN-FD).

(b) of FIG. 1 commonly configures a main use communication and a backup use communication path with a star type network. (b) of FIG. 1 is configured with an autonomous driving ECU 1, a data ECU 2, a network switch 6, a network switch 7, a main use network 10, and a backup use network 30.

The network switch 7 is identical to the network switch 6, and is a device for relaying data. However, a corresponding communication interface may be different from that of the network switch 6.

The backup use network 30 is identical to the main use network 10, is a transmission path for configuring a star type network, and for example, complies with an onboard dedicated Ethernet (registered trademark). In addition, a configuration complying with a standard of which the highest communication rate is different from that of the main use network 10 is considered as an example.

In the configuration illustrated in FIG. 1, transmission and reception of data between the autonomous driving ECU 1 and the data ECU 2 are basically performed through the main use network 10, and in a case in which a failure occurs in the main use network 10, the transmission and reception are performed through the backup use network 30. In addition, a network to be used may not be switched over according to presence or absence of the failure occurrence, and a method in which transmission and reception of data are performed by using both of the main use network 10 and the backup use network 30 in advance, and data to be received by the receiving side ECU is selected may be adopted. In this manner, as long as it is possible to avoid a complete interruption of data communication between the autonomous driving ECU 1 and the data ECU 2 due to the network failure occurrence, other methods of transmitting and receiving data may be adopted.

In addition, the configurations of the main use network 10 and the backup use network 20 may be replaced with each other. For example, in (a) of FIG. 1, the main use network 10 may be a bus type, and the backup use network 20 may be a star type.

In the below example, descriptions are performed by using the network configuration illustrated in (a) of FIG. 1 as an example.

In addition, In FIG. 1, three data ECUs 2 are illustrated, but it is not necessary to limit thereto, and the number of the data ECUs 2 may be one or more.

In addition, the configuration illustrated in FIG. 1 illustrates ECUs related to the autonomous driving system and the high degree of support system and a network topology between the ECUs, and it does not express the entire configuration of a vehicle system, and is also the same in the below examples.

<System Configuration>

FIG. 2 is a configuration example of an onboard system, the autonomous driving ECU 1 and the data ECU 2 related to Example 1. The onboard system is configured with the autonomous driving ECU 1, the plurality of data ECUs 2, the network switch 6, the main use network 10, and the backup use network 20. Main functions of each of the devices and a connection form between each of the devices are identical to those illustrated in (a) of FIG. 1. In addition, it is not necessary for each of the plurality of data ECUs 2 to have completely the same configuration. In FIG. 2, a representative configuration is illustrated as the configuration of the data ECU 2.

<Configuration of Autonomous Driving ECU 1>

The autonomous driving ECU 1 is configured with a high speed NW interface 100, a low speed NW interface 101, a communication control unit 102, an NW failure detection unit 103, a demand information determination unit 104, an autonomous driving situation determination unit 105, a vehicle control plan unit 106, a demand autonomous driving data construction unit 107, a vehicle control unit 108, and a control NW interface 109.

In the present example, it is assumed that the autonomous driving ECU 1 includes a CPU and a memory, which are not illustrated, and the high speed NW interface 100, the low speed NW interface 101, and the control NW interface 109 as hardware. The CPU performs an operation according to a program stored in the memory, and thus functions as the communication control unit 102, the NW failure detection unit 103, the demand information determination unit 104, the autonomous driving situation determination unit 105, the vehicle control plan unit 106, the demand autonomous driving data construction unit 107, and the vehicle control unit 108 are realized. But, the present example is not limited to such an embodiment, and loading the entirety or a part of the above described functions as hardware is possible.

The high speed NW interface 100 is an interface to be connected to the data ECU 2 through the main use network 10 and the network switch 6, and includes a connector complying with, for example, Ethernet (registered trademark), an Integrated Circuit (IC), a controller, a driver, and the like.

The low speed NW interface 101 is an interface to be connected to the data ECU 2 through the backup use network 20, and includes a connector complying with, for example, the CAN or CAN-FD, a transceiver, a controller, a driver, and the like.

The communication control unit 102 performs communication control for transmitting and receiving data through the high speed NW interface 100 and the low speed NW interface 101.

The NW failure detection unit 103 performs detection whether a failure occurs in the main use network 10. For example, the detection may be realized by a method in which a control packet for KeepAlive is transmitted and received between the autonomous driving ECU 1 and the data ECU 2 in a regular period, and an omission or a delay of the control packet is monitored.

The demand information determination unit 104 specifies a network failure range from a network failure location, and determines a reduction guideline of autonomous driving related information demanded from the autonomous driving ECU 1 to the data ECU 2, that is, autonomous driving related information transmitted from the data ECU 2 to the autonomous driving ECU 1. As the reduction guideline of the autonomous driving related information, there is, for example, a size, a classification, or the like of information. The reduction guideline of the autonomous driving related information indicates a guideline which reduces only the amount of information without changing the type of the transmitted and received information, or reduces the amount of the information by changing the type of the transmitted and received information. Specific processing contents of the demand information determination unit 104 are described later.

The autonomous driving situation determination unit 105 determines a load status of a driving speed of the host vehicle, information related to objects such as a movable body in the vicinity of the host vehicle, an obstacle, and a landmark, such as the volume of traffic of a movable body (vehicle, pedestrian, bicycle, and motorcycle) in the vicinity of the host vehicle, and a relative velocity between the host vehicle and another movable body, or the autonomous driving dedicated high precision map to the autonomous driving ECU 1. The determination information is used in information demanded from the autonomous driving ECU 1 to the data ECU 2, for reducing the autonomous driving data, in the demand autonomous driving data construction unit 107, which is described later.

The vehicle control plan unit 106 determines a vehicle driving control plan. The vehicle control plan indicates vehicle course (driving track) information which indicates how a vehicle is going to (going straight, left turn, right turn, lane change to the left, and lane change to the right) at the time of the failure occurrence, or vehicle course (driving track) information after the network failure occurrence determined on the basis of the information on the network failure range which is determined by the demand information determination unit 104. The vehicle course information after the network occurrence indicates information on a vehicle course (driving track), such as continuing the autonomous driving while maintaining the speed, continuing the autonomous driving while reducing the speed, stopping the vehicle at the shoulder of a road while gradually reducing the speed, and stopping the vehicle without stopping the vehicle at the shoulder of a road.

The demand automatic data construction unit 107 constructs contents information on the autonomous driving data demanded to the data ECU 2. The contents of the autonomous driving data demanded from the autonomous driving ECU 1 indicates coordinate information on two points for specifying a range 503 of a vehicle object, with respect to the data ECU 2 calculating vehicle recognition information by using a sensor which is described later. In addition, the contents of the autonomous driving data demanded from the autonomous driving ECU 1 indicates information for designating a range of updated map information, with respect to the data ECU 2 which provides map information with high precision.

The vehicle control unit 108 controls a driving of the vehicle by using the autonomous driving control related information transmitted from the data ECU 2.

The control NW interface 109 is an interface toward a control network of the vehicle, and the vehicle control unit 108 outputs a signal related to a vehicle driving control to a controller or an ECU such as an accelerator, a brake, and a steering, through the interface.

<Configuration of Data ECU 2>

The data ECU 2 is configured with a high speed NW interface 200, a low speed NW interface 201, an NW failure detection unit 202, a communication control unit 203, a demand autonomous driving data reception determination unit 204, and a demand autonomous driving data response construction transmission unit 205.

In the present example, it is assumed that the data ECU 2 includes a CPU and a memory, which are not illustrated, and the high speed NW interface 200, and the low speed NW interface 201 as hardware. The CPU performs an operation according to a program stored in the memory, and thus functions as the NW failure detection unit 202, the communication control unit 203, the demand autonomous driving data reception determination unit 204, and the demand autonomous driving data response construction transmission unit 205 are realized. But, the present example is not limited to such embodiment, and loading the entire or a part of the above described functions as hardware is possible.

The high speed NW interface 200 is identical to the high speed NW interface 100, and is an interface to be connected to the data ECU 2 through the main use network 10 and the network switch 6.

The low speed NW interface 201 is identical to the low speed NW interface 101, and is an interface to be connected to the data ECU 2 through the backup use network 20.

The NW failure detection unit 202 is identical to the NW failure detection unit 103, and performs detection on whether a failure occurs in the main use network 10. In addition, in a case in which the system is configured so that it is possible to detect the failure by only the autonomous driving ECU 1, the NW failure detection unit 202 may be omitted from the configuration.

The communication control unit 203 performs a communication control for data transmission and reception through the high speed NW interface 200 and the low speed NW interface 201.

The demand autonomous driving data reception determination unit 204 determines whether the demand autonomous driving data, which is transmitted from the autonomous driving ECU 1 through the backup use network 20, is received from the low speed NW interface 201 or not.

The demand autonomous driving data response construction transmission unit 205 creates, constructs, and transmits the autonomous driving data corresponding to a demand autonomous driving data request from the autonomous driving ECU 1, to the autonomous driving ECU 1 through the low speed NW interface 201.

<Operation of Demand Information Determination Unit 104>

Figure 4:
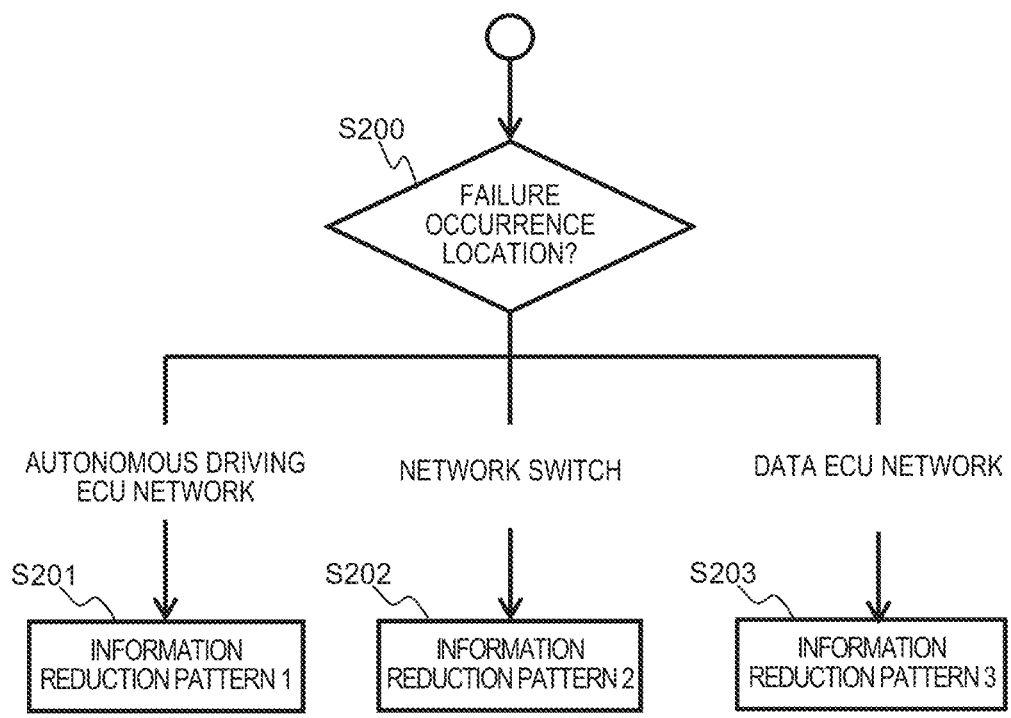
FIG. 4 A part of the processing flow of the autonomous driving ECU and table information in the autonomous driving ECU and the data ECU according to Example 1.

A processing flow of the demand information determination unit 104 is illustrated in (a) of FIG. 4. When the NW failure detection unit 103 detects the network failure occurrence, the flow is started.

In step S200, the determination of the failure occurrence location is performed. In a case in which the failure occurrence location is an autonomous driving ECU network, an information reduction pattern 1 is performed (step S201), in a case of the network switch 6, an information reduction pattern 2 is performed (step S202), and in a case in which the failure occurrence location is a data ECU network, an information reduction pattern 3 is performed (step S203).

In addition, the autonomous driving ECU network indicates a transmission path between the autonomous driving ECU 1 and the network switch 6, and the data ECU network indicates a transmission path between the data ECU 2 and the network switch 6. An object of the flow is to be able to change a reduction pattern of information according to the number of the data ECUs 2, from a change in the number of the data ECUs 2 using the backup use network 20, according to the failure occurrence location. Therefore, the information reduction pattern 1, pattern 2, and pattern 3 of step S201 to step S203 may be the same. In addition, the failure occurrence location of step S201 to step S203 may be further subdivided.

<Data Reduction Method 1>

An example of a method of determining information by the demand autonomous driving data construction unit 107, by using the determination information on the autonomous driving situation determination unit 105 is illustrated in FIG. 5.

FIG. 5 is a diagram illustrating the range of the vehicle object recognized on the basis of the sensor information from the camera or the radar in the data ECU 2, and the range of the vehicle object transmitted from the data ECU 2 to the autonomous driving ECU 1, at the time of the network failure occurrence.

In reality, a movable body, an obstacle, a landmark, a white line, a road sign, and the like are also recognized, besides the vehicle, but, for simplification of description, it is limited to the vehicle.

The diagram is configured with a host vehicle 500, another vehicle 501, a range 502 of a vehicle object recognized from a sensor, a range 503 of the vehicle object transmitted from the data ECU 2 to the autonomous driving ECU 1, and a host vehicle driving speed 504.

(a) and (b) of FIG. 5 are an example in which the numbers of the other vehicles 501 in the range 502 of the vehicle object recognized from the sensor and the host vehicle driving speeds 504 are different, therefore, the range 503 of the vehicle object transmitted from the data ECU 2 to the autonomous driving ECU 1 is changed (reduced) with respect to the range 502 of the vehicle object recognized from the sensor, and thus it is possible to reduce the magnitude of vehicle object information transmitted from the data ECU 2 to the autonomous driving ECU 1. In addition, in a case in which the present example is not applied thereto, the range 502 of the vehicle object recognized from the sensor is identical to the range 503 of the vehicle object transmitted from the data ECU 2 to the autonomous driving ECU 1.

In (b) of FIG. 5, since the number of the other vehicles 501 is less and the host vehicle driving speed 504 is faster than in comparison with (a) of FIG. 5, even though the range 502 of the vehicle object recognized from the sensor is the same, the range 503 of the vehicle object transmitted from the data ECU 2 to the autonomous driving ECU 1 becomes wider.

In addition, since the range 502 of the vehicle object and the range 503 of the vehicle object are a rectangle, in a case in which it is assumed that coordinates of right and left ends of the range 502 of the vehicle object recognized from the sensor are (0, 0)=(x coordinate, y coordinate), it is possible to perform expression by coordinates information on two location illustrated in the drawing. However, a shape of the object range may be other shapes other than the rectangular. In this case, if necessary, the coordinate information on two or more locations is used in the expression. In addition, it is considered that the shape of the object range is changeable according to the driving situation at the time of the failure occurrence.

<Data Reduction Method 2>

An example of a method of determining information by the demand autonomous driving data construction unit 107, by using the determination information on the autonomous driving situation determination unit 105 is illustrated in FIG. 6.

FIG. 6 is a diagram illustrating an idea in which the range of the map information with high precision which is loaded from the data ECU 2 to the autonomous driving ECU 1 is changeable, according to a load status of the autonomous driving dedicated map information with high precision, at the time of the network failure occurrence.

(a) of FIG. 6 illustrates a load processing of the map in a case in which the network failure does not occur, and is configured with a host vehicle 600 during an autonomous driving, a driving plan track 601, a map 602 with high precision loaded to the autonomous driving ECU 1, and a map 603 with high precision scheduled to be newly loaded later. According to the driving plan track 601 of the host vehicle 600, the load of map with high precision is regularly performed. In this case, it is assumed that a map with high precision of 2 [km] is loaded in 30 [sec] interval as an example.

(b) and (c) of FIG. 6 illustrate a load processing of the map in a case in which the network failure occurs, and newly adds an autonomous driving cancel release schedule point 604, in comparison with (a) of FIG. 6. The autonomous driving cancel release schedule point 604 is set to a predetermined point within a navigation distance in which the vehicle control plan unit 106 of the autonomous driving ECU 1 is able to continue the autonomous driving, in a case in which it is determined that the vehicle control plan unit 106 of the autonomous driving ECU 1 is not able to continue the autonomous driving by the network failure occurrence or the like. The autonomous driving cancel release schedule point 604 indicates a point in which a vehicle control authority is assigned to a driver at the latest, or a vehicle is stopped at a shoulder of a road or a traffic lane.

In addition, the vehicle control plan unit 106 sets a point where the vehicle is able to reach by avoiding a turning at an intersecting point and the like that requires a complex control of the vehicle and where it is possible to assign the vehicle control authority as much secure as possible as the autonomous driving cancel release schedule point 604, in spite of the vehicle driving control plan until it is determined that the autonomous driving is not able to be continued. In addition, in a case in which it is determined that the autonomous driving is not able to be continued while the turning at the intersecting point is performed, the turning at the intersecting point is ended as it is, and then a point in which it is possible to assign the vehicle control authority by avoiding the complex control of the vehicle is set as the autonomous driving cancel release schedule point 604.

In a case of (b) of FIG. 6, since the map with high precision up to the autonomous driving cancel release schedule point 604 is loaded in advance, the map is not newly loaded. On the other hand, in a case of (c) of FIG. 6, since a difference between the autonomous driving cancel release schedule point 604 and the loaded map 602 with high precision is 0.5 [km], as shown in (a) of FIG. 6, a portion of 2.0 [km] is not newly loaded, and a load of only 0.5 [km] is performed. Therefore, similarly to the example described by FIG. 5, it is possible to reduce an amount of information on the map with high precision which flows between the autonomous driving ECU 1 and the data ECU 2.

On the other hand, even in a case in which the failure occurs in the network, in a case in which the autonomous driving is able to be continued, it is possible to reduce an amount of data by limiting an obtainment of the map information, which corresponds to the portion of 2 km at the normal time, to an obtainment corresponding to the portion of 1 km.

<Data Reduction Method 3>

An example of a method of determining information by the demand autonomous driving data construction unit 107, by using the determination information on the autonomous driving situation determination unit 105 is illustrated in FIG. 7.

Similarly to FIG. 5, FIG. 7 is a diagram illustrating the range of the vehicle object recognized on the basis of the sensor information from the camera in the data ECU 2, and the range of the vehicle object transmitted from the data ECU 2 to the autonomous driving ECU 1.

(a) of FIG. 7 illustrates a form in which going straight is to be performed at the time of the network failure occurrence. (b) of FIG. 7 illustrates a form in which changing a lane to the left is to be performed at the time of the network failure occurrence. (c) of FIG. 7 illustrates a form in which changing a lane to the right is to be performed at the time of the network failure occurrence. Examples in which the range 503 of the vehicle object is changeable (is reduced in comparison with the range 502 of the vehicle object recognized from the sensor) according to vehicle driving control plans of each of (a), (b), and (c), are illustrated.

Therefore, the range 503 of the vehicle object is changed according to the vehicle driving control plan, and thus it is possible to reduce the amount of the information on the vehicle object transmitted from the data ECU 2 to the autonomous driving ECU 1. In addition, in a case of an example of the load of the map with high precision of FIG. 6, since the driving plan track 601 corresponds to the vehicle driving control plan and it is possible to load information on the map with high precision which is necessary according to the driving plan track 601, it is possible to reduce the amount of information on the map with high precision transmitted from the data ECU 2 to the autonomous driving ECU 1.

As an example of another method of reducing data, a processing flow is conceivable in which the demanded autonomous driving data number 400 and a table of the data transmission pattern 401 corresponding to the demanded autonomous driving data number 400, shown in (b) of FIG. 4, are maintained in each of the autonomous driving ECU 1 and the data ECU 2, a request of the autonomous driving data number 400 which is demanded from the autonomous driving ECU 1 to the data ECU 2 is transmitted, and a response of the data transmission pattern 401 corresponding to the number thereof is transmitted from the data ECU 2 to the autonomous driving ECU 1.

Such demand autonomous driving data is transmitted through the backup use network 20 with respect to the data ECU 2 which is not able to transmit and receive data by using the main use network 10 by the network failure occurrence.

<Processing Sequence of Data Reduction Processing>

Figure 3:
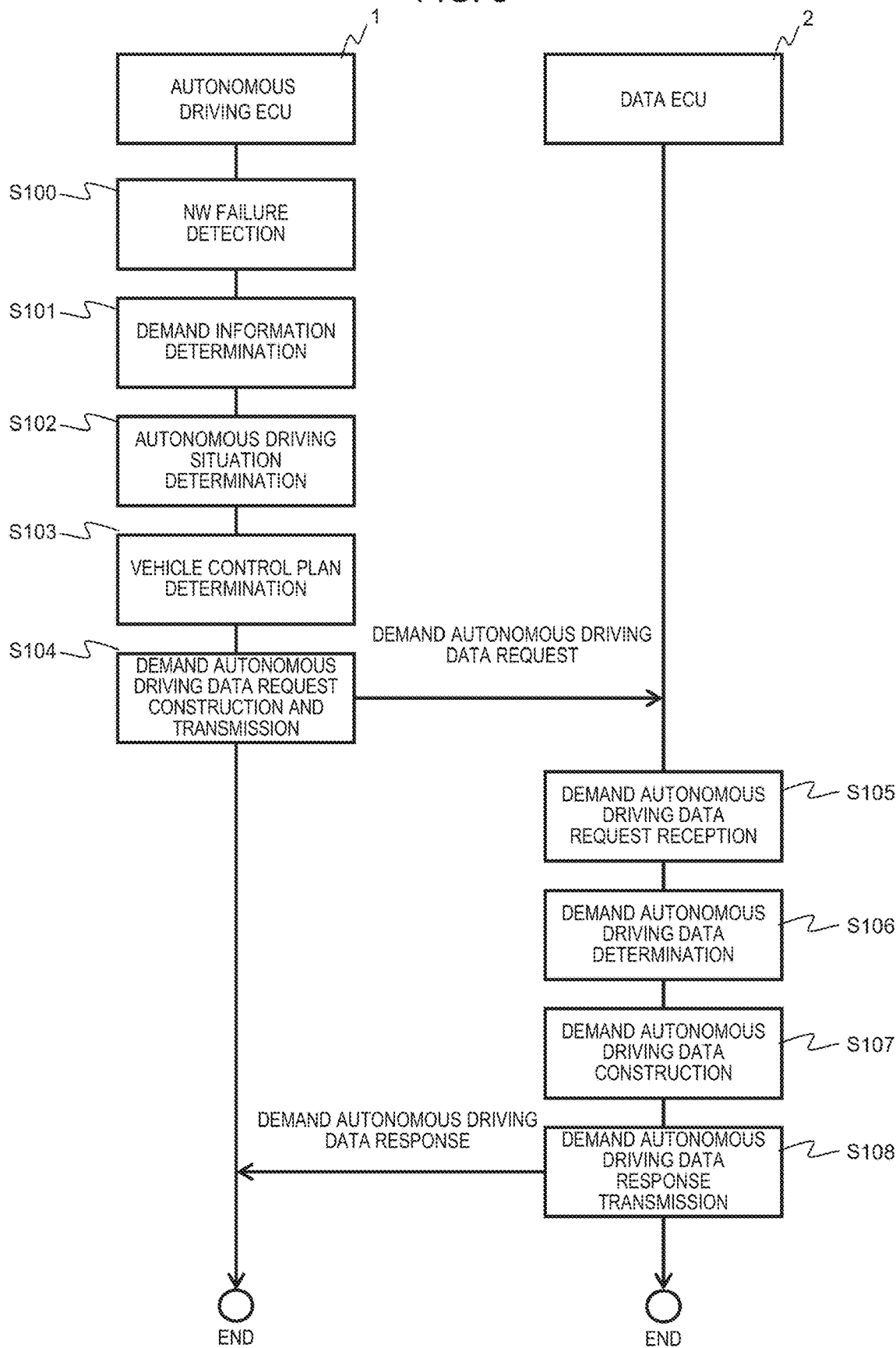
FIG. 3 A processing flow of the autonomous driving ECU and the data ECU according to Example 1.

FIG. 3 illustrates a processing sequence of the autonomous driving ECU 1 and the data ECU 2, for reducing an amount of information on autonomous driving related data which is transmitted from the data ECU 2 to the autonomous driving ECU 1, on the basis of a request instruction from the autonomous driving ECU 1 to the data ECU 2, at the time of the network failure occurrence.

The present processing sequence is started in a case in which the NW failure detection unit 103 of the autonomous driving ECU 1 detects the network failure (S100).

In step S101, the NW failure detection unit 103 grasps a network failure range by specifying a network failure occurrence location, so as to determine a reduction pattern of information demanded to the data ECU 2 ((a) of FIG. 4).

Then, a transition to step S102 is performed, and the autonomous driving situation determination unit 105 performs a determination of the driving situation of the host vehicle and the vehicles around the host vehicle or the load status of the map with high precision at the time of the network failure occurrence (FIG. 5 and FIG. 6).

In addition, a transition to step S103 is performed, and the vehicle control plan unit 106 determines how the driving of the host vehicle is controlled at the time of the network failure occurrence (FIG. 7)

Then, a transition to step S104 is performed. The demand autonomous driving data construction unit 107 determines and constructs the autonomous driving data (demand autonomous driving data request) demanded to the data ECU 2, by using the information determined by the NW failure detection unit 103, the autonomous driving situation determination unit 105, and the vehicle control plan unit 106 in S101 to S103, and transmits the autonomous driving data to the backup use network 20 (data ECU 2) through the low speed NW interface 101. In the autonomous driving ECU 1, the processes from S100 to S104 are repeated until the NW failure detection unit 103 does not detect the network failure.

In addition, in step S104, the demand autonomous driving data request, which is constructed by the demand autonomous driving data construction unit 107 and transmitted through the low speed NW interface 101 may be transmitted in a case in which the network failure does not occur as well as after the network failure occurs. At this time, the transmission may be performed through the low speed NW interface 101, and in a case in which the network failure does not occur, the high speed NW interface 100 may be used.

In a case in which the communication control unit 203 of the data ECU 2 receives the demand autonomous driving data request, a transition to step S106 is performed.

In step S106, a determination of the autonomous driving data which is demanded from the autonomous driving ECU 1 is performed, on the basis of the demand autonomous driving data request.

In addition, a transition to step S107 is performed, and the demand autonomous driving data response construction transmission unit 205 performs a construction of the autonomous driving data determined by step S106.

Then, a transition to step S108 is performed, and the communication control unit 203 performs a transmission to the autonomous driving ECU 1 through the low speed NW interface 201 and the backup use network 20.

It is possible to reduce the amount of information on the autonomous driving related data to be transmitted and received between the ECUs at the time of the network failure occurrence, by the operation described above. Therefore, it is possible to configure the backup use network 20 as a narrow bandwidth in comparison with the main use network 10, or to share a network between a plurality of ECUs like a bus type topology such as the CAN. Thus, in comparison with the CAN, it is possible to construct a network with low cost and high reliability in comparison with a case in which a communication method with high cost such as Ethernet is applied to the backup use network 20.

In Example 1, although the communication method at the time of the network failure occurrence is described, it is possible to apply the present example to a case in which another event other than the network failure occurs.

As the other event, a case in which the number of objects detected or recognized by a sensor for an external recognizing such as a camera or a radar is equal to or greater than a threshold value, and a case in which a processing load such as a CPU use rate in the autonomous driving ECU 1 is equal to or greater than a threshold value are considered. In this case, the autonomous driving ECU 1 and the data ECU 2 may perform communication through the main use network 10, or may perform communication through the backup use network 20.

In a case in which an amount of data is reduced by using the CPU use rate as a trigger, it is necessary for the autonomous driving ECU 2 to include a CPU monitor unit which monitors an amount of use of a CPU in FIG. 2. The CPU monitor unit monitors the use rate of the CPU, and determines that the event occurs in a case in which the use rate is equal to or greater than the threshold value. In addition, it is also possible to include a thermometer which measures the temperature of the CPU, and performs the determination that the use rate of the CPU is high in a case in which the temperature of the CPU is equal to or greater than a predetermined value.

In a case in which the autonomous driving ECU 1 detects such an event (it is also possible to detect by information sharing with the data ECU 2), the amount of information on the autonomous driving data which is transmitted from the data ECU 2 to the autonomous driving ECU 1 is reduced, in a manner identical to the case of the network failure occurrence of Example 1. Therefore, it is possible to avoid a situation in which the autonomous driving system is not functioned completely by a reason such as stopping the continuous processing by the autonomous driving ECU 1, at the time of the event occurrence.

In addition, as an example of another event, a case in which a failure occurs in a portion of the autonomous driving ECU 1 or the data ECU 2, or an application of the present example in a case in which an arrival at a specific point or area is performed in association with information on the map with high precision or information provided from a cloud is considered.

By changing a kind of information on autonomous driving data transmitted from the data ECU 2 to the autonomous driving ECU 1 at the time of the occurrence of such an event, it is possible to avoid the situation in which the autonomous driving system is not functioned completely at the time of the event occurrence. In addition, the specific point or area indicates an area in which an external recognition object recognized by a sensor such as a camera or a radar in a town or the like becomes voluminous, an area in which a road or a landmark is newly built, an area in which a traffic rule is changed, an area in which an accident occurs due to an incorrect detection of the external recognition object, and the like.

In association with reducing the amount of information on the autonomous driving data at the time of the occurrence of the above described various events, in a case of the configuration in which the autonomous driving data is transmitted from the data ECU 2 to the autonomous driving ECU 1, when a failure does not occur in the main use network 10, the autonomous driving data may be transmitted and received by using the main use network 10.

In addition, in association with reducing the amount of information on the autonomous driving data illustrated in FIG. 4 to FIG. 7, it is also considered that in a vehicle including a plurality of multiple sensors for high reliability, a data transmission of a specific sensor is stopped according to a situation, so as to reduce the amount of information on the autonomous driving data. As the plurality of sensors, there are a camera or a laser radar, a millimeter wave radar, infrared light, and ultrasonic waves. Since each has advantages and disadvantages, it is preferable to use according to a requirement and a purpose such as a kind of a sensing object, the brightness (day, night, town, and suburb) around a vehicle, a climate (clear, rain, and fog), cost, raw data magnitude. Therefore, although the data transmission of the specific sensor which is not appropriate to such a situation is stopped according to the driving situation, the driving control is not affected. Each of the above described events can be used as a trigger which stops the data transmission of the specific sensor. Besides, information such as a climate, time zone, the surrounding brightness, the vehicle position, and the like are used.

Example 2

Figure 8:
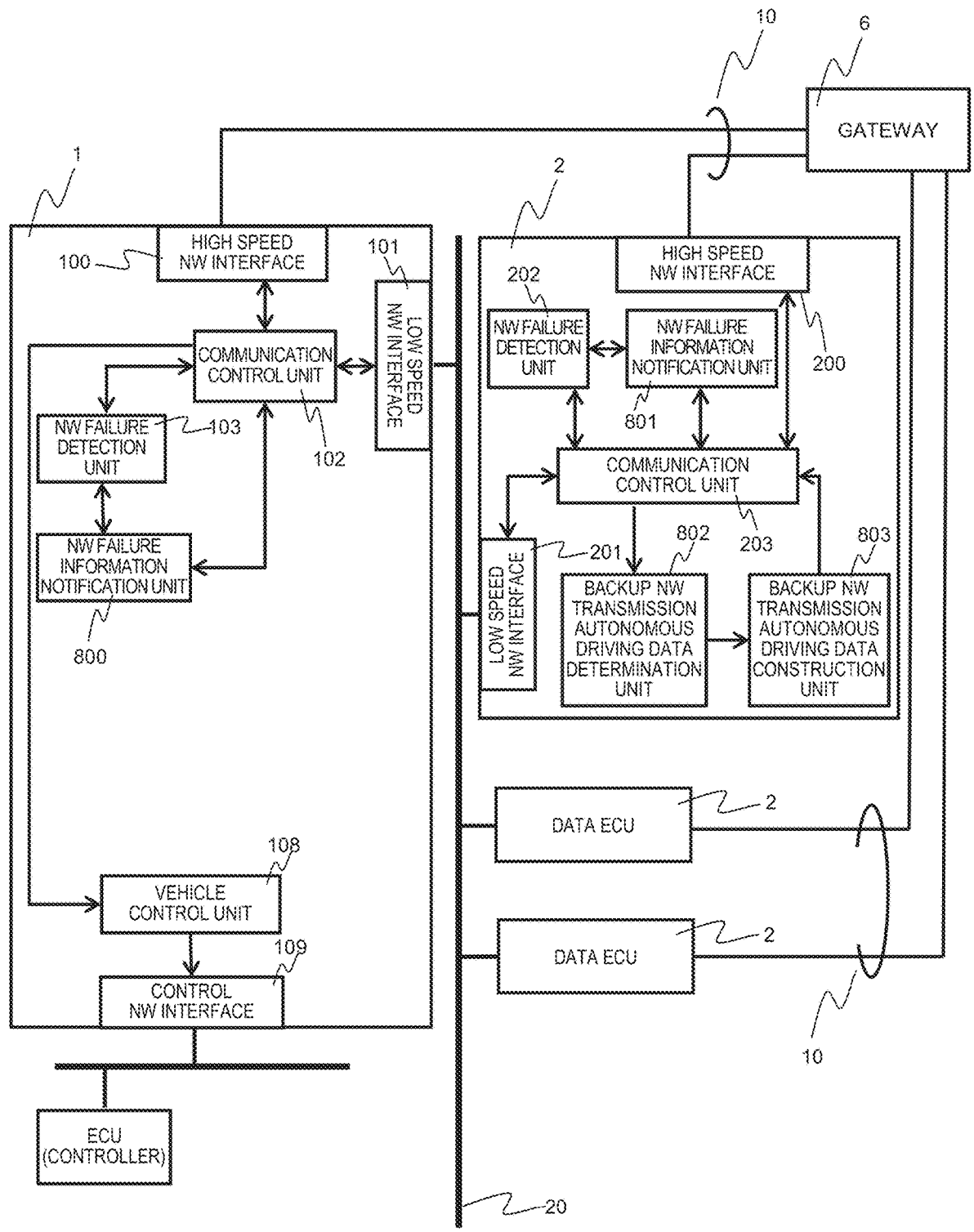
FIG. 8 A configuration of an autonomous driving ECU and a data ECU according to Example 2.
Figure 9:
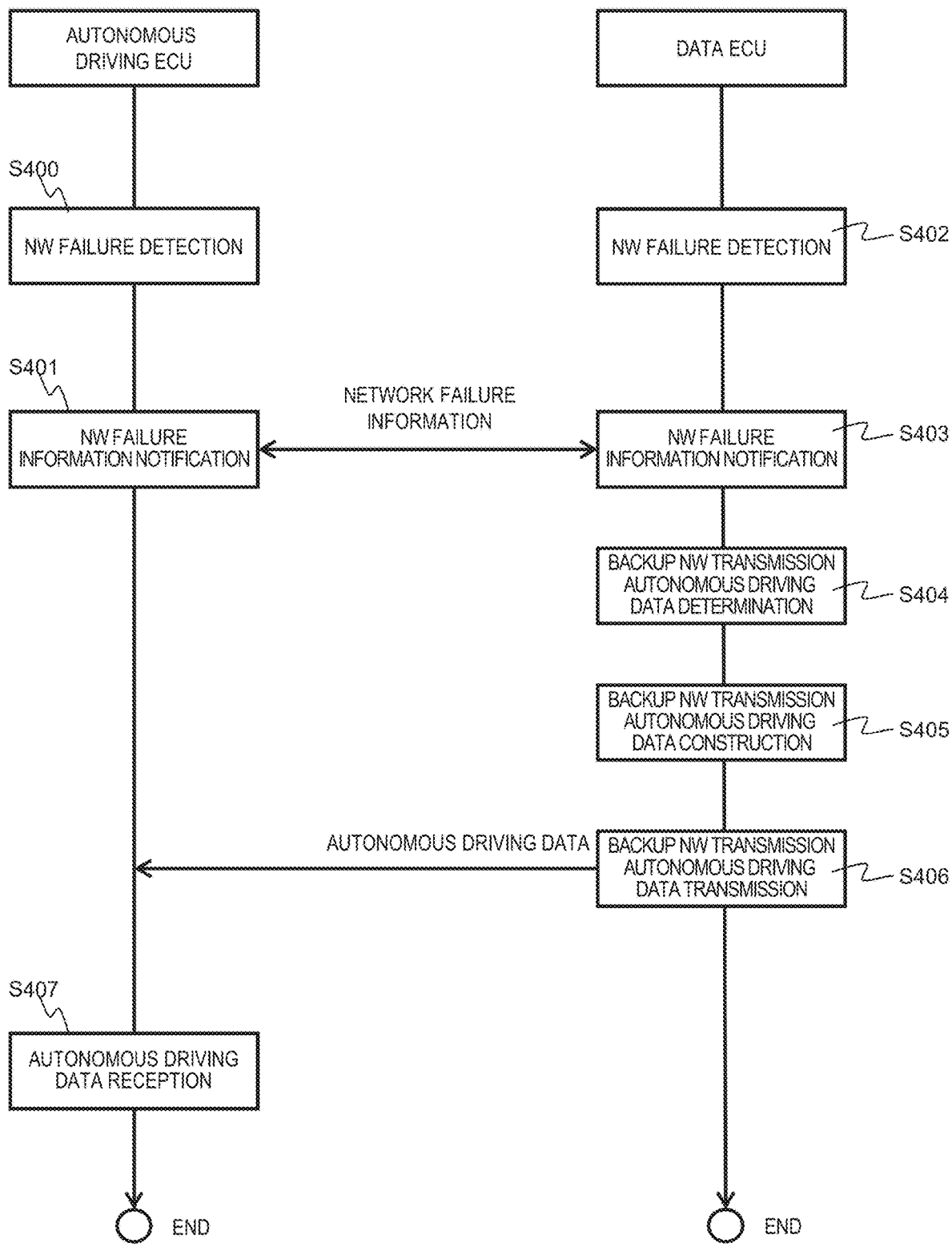
FIG. 9 A processing flow of the autonomous driving ECU and the data ECU according to Example 2.

In Example 2, a configuration of a device, and a method for reducing information transmitted from the data ECU 2 to the autonomous driving ECU 1 dynamically, or in a predetermined fixed pattern, without receiving a request instruction from the autonomous driving ECU 1 to the data ECU 2, at the time of a network failure occurrence, are described by using FIG. 8 and FIG. 9.

FIG. 8 is a configuration example of an onboard system related to Example 2, and the autonomous driving ECU 1 and the data ECU 2.

The autonomous driving ECU 1 is configured with the high speed NW interface 100, the low speed NW interface 101, the communication control unit 102, the NW failure detection unit 103, the vehicle control unit 108, the control NW interface 109, and an NW failure information notification unit 800.

In the configuration, compared to the autonomous driving ECU 1 in Example 1, the demand information determination unit 104, the autonomous driving situation determination unit 105, the vehicle control plan unit 106, and the demand autonomous driving data construction unit 107 are removed, and the NW failure information notification unit 800 is newly added.

The NW failure information notification unit 800 notifies the data ECU 2 of the network failure information detected by the NW failure detection unit 103, through the high speed NW interface 100 or the low speed NW interface 101, so as to share failure information between each of the ECUs.

The data ECU 2 is configured with the high speed NW interface 200, the low speed NW interface 201, the NW failure detection unit 202, the communication control unit 203, an NW failure information notification unit 801, a backup NW transmission autonomous driving data determination unit 802, and a backup NW transmission autonomous driving data construction unit 803.

In the configuration, compared to the configuration of the data ECU 2 in Example 1, the demand autonomous driving data reception determination unit 204 and the demand autonomous driving data response construction transmission unit 205 are removed, and the NW failure information notification unit 801, the backup NW transmission autonomous driving data determination unit 802, and the backup NW transmission autonomous driving data construction unit 803 are added.

The NW failure information notification unit 801 notifies the autonomous driving ECU 1 of failure information on another ECU, which is detected by the NW failure detection unit 103, through the high speed NW interface 200 or the low speed NW interface 201.

The backup NW transmission autonomous driving data determination unit 802 determines contents of the autonomous driving data which is transmitted from the data ECU 2 to the autonomous driving ECU 1 through the backup use network 20 rather than the main use network 10, at the time of the main use network failure occurrence.

The backup NW transmission autonomous driving data construction unit 803 performs a construction processing of the contents of the autonomous driving data which is determined by the backup NW transmission autonomous driving data determination unit 802.

FIG. 9 illustrates a processing sequence of the autonomous driving ECU 1 and the data ECU 2 for reducing the information transmitted from the data ECU 2 to the autonomous driving ECU 1 dynamically, or in a predetermined fixed pattern, without receiving the request instruction from the autonomous driving ECU 1 to the data ECU 2, at the time of the network failure occurrence.

The present processing sequence is started in a case in which the NW failure detection unit 103 or the NW failure detection unit 202 detects the network failure (S400 and S402).

In step S401 and step S403, the NW failure information notification unit 800 or the NW failure information notification unit 801 notifies the autonomous driving ECU 1 or the data ECU 2 of the network failure information through the high speed NW interface 100 or the low speed NW interface 101, so as to perform information sharing of the network failure between ECUs in a system.

In addition, a transition to step S404 is performed, and the backup NW transmission autonomous driving data determination unit 802 of the data ECU 2 determines the contents of the autonomous driving data which is transmitted from the data ECU 2 to the autonomous driving ECU 1 through the backup use network 20 rather than the main use network 10, at the time of the main use network failure occurrence.

Then, in step S405, the backup NW transmission autonomous driving data construction unit 803 performs the construction processing of the contents of the autonomous driving data which is determined by the backup NW transmission autonomous driving data determination unit 802.

In addition, a transition to step S406 is performed, and the communication control unit 203 transmits the backup NW transmission autonomous driving data to the autonomous driving ECU 1 through the low speed NW interface 201.

Then, a transition to step S407 is performed, and the communication control unit 102 of the autonomous driving ECU 1 receives the autonomous driving data from the data ECU 2.

It is possible to reduce the amount of information on the autonomous driving related data to be transmitted and received between the ECUs at the time of the network failure occurrence, by the operation described above. Therefore, it is possible to configure the backup use network 20 as a narrow bandwidth in comparison with the main use network 10, or to share a network between a plurality of ECUs like a bus type topology such as the CAN. Thus, in comparison with the CAN, it is possible to construct a network with low cost and high reliability in comparison with a case in which a communication method with high cost such as Ethernet is applied to the backup use network 20.

In addition, it is possible to apply the present example in the case of the network failure occurrence to the case of another event occurrence identical to Example 1. It is possible to reduce the amount of information on the autonomous driving data which is transmitted from the data ECU 2 to the autonomous driving ECU 1, by applying the present example to the case of the other event occurrence. Therefore, it is possible to avoid a situation in which the autonomous driving system is not functioned completely by a reason such as stopping the continuous processing by the autonomous driving ECU 1, at the time of the event occurrence.

Example 3

Example 3 shows a method of changing data transmitted and received between ECUs, by determining whether it is possible to perform the autonomous driving or not by the autonomous driving ECU 1 or the data ECU 2, at the time of the network failure or the occurrence of the other event shown in Example 1.

Specifically, a method is shown, in which by a determination processing whether it is possible to perform the autonomous driving or not, in a case in which it is possible to perform the autonomous driving, the transmission and reception of the autonomous driving data are performed between the ECUs by using the main use network 10 or the backup use network 20, and in a case in which it is determined that it is impossible to perform the autonomous driving, transmission and reception of the autonomous driving fallback data which is necessary to fall back the autonomous driving function and perform a partial function are performed between the ECUs by using the main use network 10 or the backup use network 20.

Figure 10:
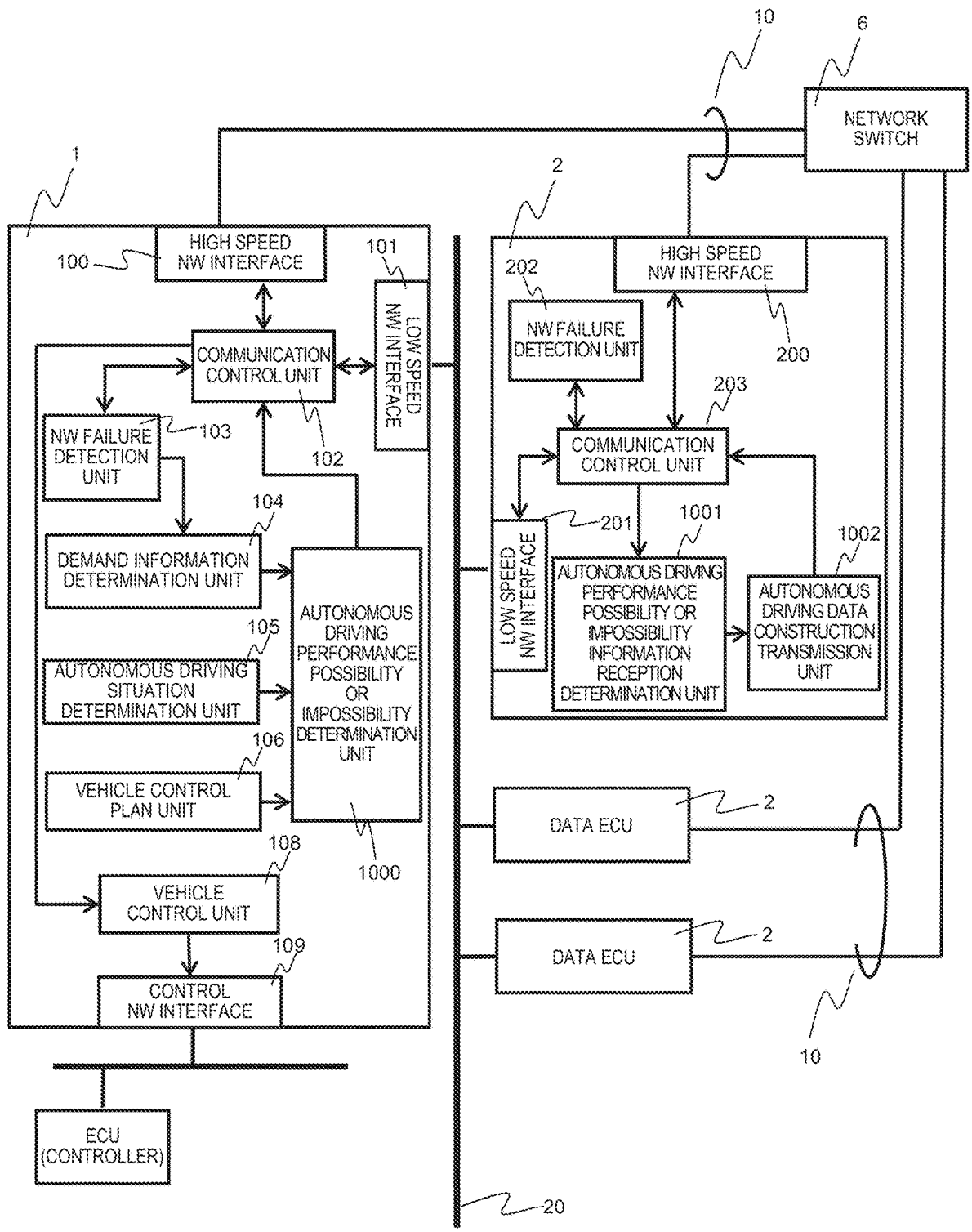
FIG. 10 A configuration of an autonomous driving ECU and a data ECU according to Example 3.
Figure 11:
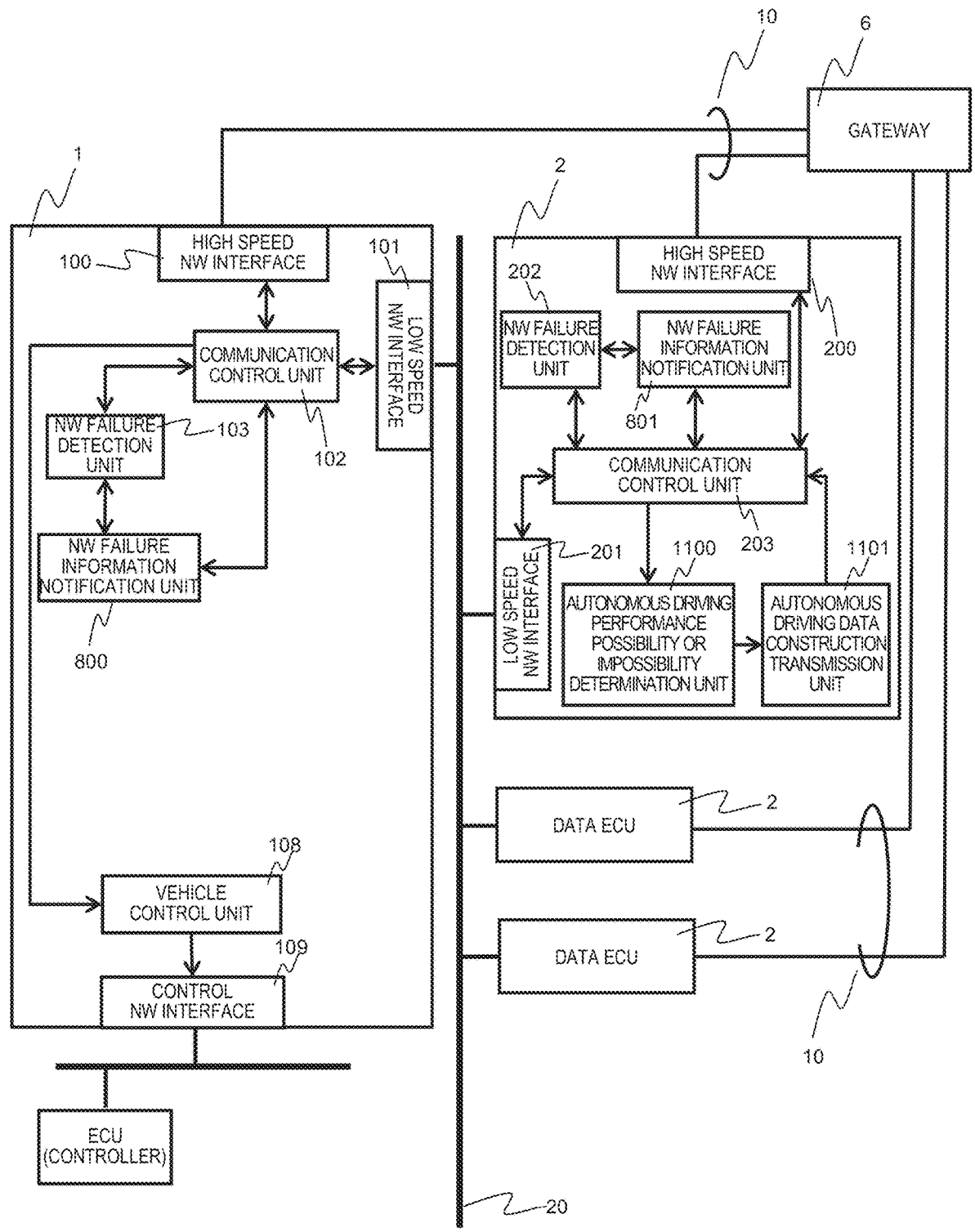
FIG. 11 A modification example of the configuration of the autonomous driving ECU and the data ECU according to Example 2.

FIG. 10 and FIG. 11 are configuration examples of an onboard system related to Example 3, and the autonomous driving ECU 1 and the data ECU 2. The configuration of FIG. 10 is based on the configuration of Example 1, and in the configuration, the demand autonomous driving data construction unit 107 of the autonomous driving ECU 1 is changed into an autonomous driving performance possibility or impossibility determination unit 1000, and the demand autonomous driving data reception determination unit 204 and the demand autonomous driving data response construction transmission unit 205 of the data ECU 2 are changed into an autonomous driving performance possibility or impossibility information reception determination unit 1001 and an autonomous driving data construction transmission unit 1002.

The autonomous driving performance possibility or impossibility determination unit 1000 performs a determination processing of whether it is possible to perform the autonomous driving from the information from the demand information determination unit 104, the autonomous driving situation determination unit 105, and the vehicle control plan unit 106, at the time of the network failure or the other event shown in Example 1 occurs. In addition, determination result information thereof is transmitted from the high speed NW interface 100 or the low speed NW interface 101 to the data ECU 2, through the communication control unit 102.

In addition, the determination result information by the autonomous driving performance possibility or impossibility determination unit 1000 may be transmitted from the autonomous driving ECU 1 to the data ECU 2 also in a case in which the network failure or the other event shown in Example 1 does not occur as well as a timing other than the time of the network failure or the other event shown in Example 1 occurs.

A network used at this time uses the high speed NW interface 100 or the low speed NW interface 101. For example, the low speed NW interface 101 may be used, in a case in which the network failure or the other event shown in Example 1 does not occur, the high speed NW interface 100 may be used, and in a case in which the network failure or the other event shown in Example 1 occurs, the low speed NW interface 101 may be used.

The autonomous driving performance possibility or impossibility information reception determination unit 1001 determines whether or not it is possible to receive the determination result information which is transmitted from the autonomous driving ECU 1 and indicates whether it is possible to perform the autonomous driving or not, at the time of the event occurrence.

The autonomous driving data construction transmission unit 1002 constructs the autonomous driving data according to the determination result information which indicates whether it is possible to perform the autonomous driving or not, and transmits the autonomous driving data to the autonomous driving ECU 1 by the high speed NW interface 200 or the low speed NW interface 201 through the communication control unit 203. The autonomous driving data mentioned here indicates the external recognition object data in the vicinity of the host vehicle, the position information with high precision, or the map information with high precision, which is necessary for the autonomous driving, in a case in which it is possible to perform the autonomous driving. In a case in which it is impossible to perform the autonomous driving, the autonomous driving data indicates information which is necessary to fall back the autonomous driving function and perform the partial autonomous driving function. The partial autonomous driving function indicates a function of any of an Automatic Emergency Breaking (AEB), a Lane Departure Warning (LDW), a Forward Collision Warning (FCW), and an Adaptive Cruise Control (ACC), or a combination of several functions.

The configuration of FIG. 11 is based on the configuration of Example 2, and in the configuration, the backup NW transmission autonomous driving data determination unit 802 and the backup NW transmission autonomous driving data construction unit 803 are changed to an autonomous driving performance possibility or impossibility determination unit 1100 and an autonomous driving data construction transmission unit 1101, respectively.

The autonomous driving performance possibility or impossibility determination unit 1100 determines whether it is possible to perform the autonomous driving, at the time of the network failure occurrence or the other event shown in Example 1 occurs.

The autonomous driving data construction transmission unit 1101 constructs the autonomous driving data on the basis of a determination processing result by the autonomous driving performance possibility or impossibility determination unit 1100, and transmits the autonomous driving data to the autonomous driving ECU 1 by the high speed NW interface 200 or the low speed NW interface 201 through the communication control unit 203. The autonomous driving data is identical to that illustrated in FIG. 10.

Although the processing flows of FIG. 10 and FIG. 11, in which the autonomous driving data which is transmitted from the data ECU 2 to the autonomous driving ECU 1 is determined by determining whether it is possible to perform the autonomous driving, at the time of the event such as the network failure occurs, are identical to each other, and the processes of FIG. 10 and FIG. 11 are identical to the process of FIG. 9, in a case of FIG. 10, the information for designating the autonomous driving data is provided from the autonomous driving ECU 1 to the data ECU 2, so as to determine the autonomous driving data which is transmitted from the data ECU 2 to the autonomous driving ECU 1.

On the other hand, in a case of FIG. 11, differently from FIG. 10, there is a difference in which the information for designating the autonomous driving data is not provided from the autonomous driving ECU 1, and the data ECU 2 independently determines the autonomous driving data which is to be transmitted to the autonomous driving ECU 1.

It is possible to reduce the amount of information on the autonomous driving related data to be transmitted and received between the ECUs at the time of the network failure occurrence or at the time of the other event occurs, by the operation described above. Therefore, it is possible to configure the backup use network 20 so as to have a narrower bandwidth than that of the main use network 10, or to share a network between a plurality of ECUs like a bus type topology such as the CAN. Thus, in comparison with the CAN, it is possible to construct a network with low cost and high reliability in comparison with a case in which a communication method with high cost such as Ethernet is applied to the backup use network 20.

In addition, in the examples 1 to 3, the method of reducing the amount of information on the autonomous driving data which is transmitted from the data ECU 2 to the autonomous driving ECU 1 at the time of the network failure or the other event occurs is described. However, at the time of the network failure or the other event occurrence, data may not be transmitted from the data ECU 2 to the autonomous driving ECU 1 on the basis of an instruction of the autonomous driving ECU 1.

Furthermore, the data ECU 2 may not transmit data to the autonomous driving ECU 1 spontaneously. Therefore, it is possible to reduce the amount of data which is transmitted from the data ECU 2 to the autonomous driving ECU 1. Thus, it is possible to reduce a bandwidth of the backup use network 20 or the CPU processing load of the autonomous driving ECU 1.

REFERENCE SIGNS LIST

1 autonomous driving ECU, 2 data ECU, 6 network switch, 10 main use network, 20 backup use network, 100 high speed NW interface, 101 low speed NW interface, 102 communication control unit, 103 NW failure detection unit, 104 demand information determination unit, 105 autonomous driving situation determination unit, 106 vehicle control plan unit, 107 demand autonomous driving data construction unit, 108 vehicle control unit, 109 control NW interface, 200 high speed NW interface, 201 low speed NW interface, 202 NW failure detection unit, 203 communication control unit, 204 demand autonomous driving data reception determination unit, 205 demand autonomous driving data response construction transmission unit, S100 NW failure detection processing, S101 demand information determination processing, S102 autonomous driving situation determination processing, S103 vehicle control plan determination processing, S104 demand autonomous driving data request construction transmission processing, S105 demand autonomous driving data request reception determination processing, S106 demand autonomous driving data determination processing, S107 demand autonomous driving data construction processing, S108 demand autonomous driving data response transmission processing, S200 failure occurrence location determination processing, S201 information reduction pattern 1 processing, S202 information reduction pattern 2 processing, S203 information reduction pattern 3 processing, 400 demanded autonomous driving data number, 401 data transmission pattern, 500 host vehicle, 501 another vehicle, 502 range of vehicle object recognized from sensor, 503 range of vehicle object transmitted from data ECU 2 to autonomous driving ECU 1, 504 host vehicle driving speed, 600 host vehicle during autonomous driving, 601 driving plan track, 602 map with high precision loaded to autonomous driving ECU 1, 603 map with high precision scheduled to be newly loaded later, 604 autonomous driving cancel release schedule point, 800 NW failure information notification unit, 801 NW failure information notification unit, 802 backup NW transmission autonomous driving data determination unit, 803 backup NW transmission autonomous driving data construction unit, S400 NW failure detection processing, S401 NW failure information notification processing, S402 NW failure detection processing, S403 NW failure information notification processing, S404 backup NW transmission autonomous driving data determination processing, S405 backup NW transmission autonomous driving data construction processing, S406 backup NW transmission autonomous driving data transmission processing, S407 autonomous driving data reception determination processing, 1000 autonomous driving performance possibility or impossibility determination unit, 1001 autonomous driving performance possibility or impossibility information reception determination unit, 1002 autonomous driving data construction transmission unit, 1100 autonomous driving performance possibility or impossibility determination unit, 1101 autonomous driving data construction transmission unit

The invention claimed is:

1. An autonomous driving system to control a host vehicle, the autonomous driving system comprising:
   an autonomous driving ECU and a plurality of data ECUs are connected with each other through a first network and are connected with each other through a second network having a communication bandwidth that is narrower than a communication bandwidth of the first network,
   wherein each of the plurality of data ECUs is programmed to:
   construct first autonomous driving data to be transmitted to the autonomous driving ECU, and
   transmit the first autonomous driving data to the autonomous driving ECU via the first network,
   wherein the autonomous driving ECU is programmed to:
   receive the first autonomous driving data from the plurality of data ECUs via the first network, and
   perform autonomous control of the host vehicle on the basis of the first autonomous driving data received from the plurality of data ECUs,
   wherein, in a case in which a predetermined event occurs, one or more data ECUs among the plurality of data ECUs are further programmed to construct second autonomous driving data and transmit the second autonomous driving data to the autonomous driving ECU via the second network,
   wherein, in a case where the first autonomous driving data is first sensor data, a range of second sensor data related to objects around the host vehicle included in the second autonomous driving data is reduced with respect to a range of the first sensor data related to objects around the host vehicle included in the first autonomous driving data,
   wherein, in a case where the first autonomous driving data is map data, a map size of a map included in the second autonomous driving data is reduced with respect to a map size of a map included in the first autonomous driving data,
   wherein the autonomous driving ECU is further programmed to determine a release point at which the autonomous control of the host vehicle is not able to be performed, and
   wherein the map included in the second autonomous driving data includes the release point and the map included in the first autonomous driving data does not include the release point.

2. The autonomous driving system according to claim 1, wherein the one or more data ECUs are further programmed to reduce the range of the second sensor data related to objects around the host vehicle included in the second autonomous driving data according to a driving situation of the host vehicle.

3. The autonomous driving system according to claim 1, wherein the predetermined event is a case in which a failure occurs in the first network,
   the autonomous driving ECU is further programmed to:
   determine a location of the predetermined event within the host vehicle, determine which of the plurality of data ECUs which is not able to transmit the autonomous driving data through the first network due to the failure, determine a driving situation of a vicinity of the host vehicle at a time of occurrence of the failure and before the failure, specify a control plan of the host vehicle at the time of occurrence of the failure and after the failure, and select the one or more data ECUs according to at least the location of the predetermined event, the driving situation, and the control plan.

4. The autonomous driving system according to claim 3, wherein the control plan of the host vehicle after the failure in the first network is a plan from the time when the failure in the first network occurs to a predetermined time thereafter when the host vehicle is automatically stopped or to a predetermined time thereafter when a driving authority of the host vehicle is assigned to an occupant of the host vehicle.

5. The autonomous driving system according to claim 1, wherein the predetermined event is any of a case in which a failure occurs in the first network, a case in which a processing load of the autonomous driving ECU is equal to or greater than a predetermined amount, a case in which a temperature of the autonomous driving ECU is equal to or greater than a predetermined temperature, a case in which an amount of data constructed by the plurality of data ECUs is equal to or greater than a predetermined amount, a case in which a failure occurs in a portion of the autonomous driving ECU or the plurality of data ECUs, or a case in which position information on the host vehicle is a predetermined coordinate.

6. An autonomous driving control method in an autonomous driving system in which an autonomous driving ECU and a plurality of data ECUs are connected with each other through a first network and are connected with each other through a second network having a communication bandwidth that is narrower than a communication bandwidth of the first network, the method comprising:

constructing, by the plurality of data ECUs, first autonomous driving data;

transmitting, by the plurality of data ECUs, the first autonomous driving data to the autonomous driving ECU via the first network;

autonomously controlling, by the autonomous driving ECU, a host vehicle on the basis of the first autonomous driving data constructed by the plurality of data ECUs and transmitted from the plurality of data ECUs via the first network;

upon determining that a predetermined event occurs, one or more data ECUs among the plurality of data ECUs further construct second autonomous driving data and transmit the second autonomous driving data to the autonomous driving ECU via the second network;

autonomously controlling, by the autonomous driving ECU, the host vehicle on the basis of the second autonomous driving data constructed by the one or more data ECUs and transmitted from the one or more data ECUs via the second network, wherein, in a case where the first autonomous driving data is first sensor data, a range of second sensor data related to objects around the host vehicle included in the second autonomous driving data is reduced with respect to a range of the first sensor data related to objects around the host vehicle included in the first autonomous driving data, wherein, in a case where the first autonomous driving data is map data, a map size of a map included in the second autonomous driving data is reduced with respect to a map size of a map included in the first autonomous driving data, wherein the autonomous driving ECU determines a release point at which the autonomous control is not able to be performed, and wherein the map included the second autonomous driving data includes the release point and the map included the first autonomous driving data does not include the release point.

7. The autonomous driving control method according to claim 6, wherein the one or more data ECUs are further programmed to reduce the range of the second sensor data related to objects around the host vehicle included in the second autonomous driving data according to a driving situation of the host vehicle.

8. The autonomous driving control method according to claim 7, wherein the predetermined event is a case in which a failure occurs in the first network, and wherein the autonomous driving ECU determines a location of the predetermined event within the host vehicle, determines which of the plurality of data ECUs is not able to transmit the autonomous driving data through the first network due to the failure, determines a driving situation of a vicinity of the host vehicle at a time of occurrence of the failure and before the failure, specifies a control plan of the host vehicle at the time of the failure and after the failure, and selects the one or more data ECUs according to the location of the predetermined event, the driving situation, and the control plan.

9. The autonomous driving control method according to claim 8, wherein the control plan of the host vehicle after the failure in the first network is a plan from the time when the failure in the first network occurs to a predetermined time thereafter when the vehicle is automatically stopped or to a predetermined time thereafter when a driving authority of the host vehicle is assigned to an occupant of the host vehicle.

10. The autonomous driving control method according to claim 6, wherein the predetermined event is any of a case in which a processing load of the autonomous driving ECU is equal to or greater than a predetermined amount, a case in which a temperature of the autonomous driving ECU is equal to or greater than a predetermined temperature, a case in which an amount of data constructed by the plurality of data ECUs is equal to or greater than a predetermined amount, a case in which a failure occurs in a portion of the autonomous driving ECU or the plurality of data ECUs, or a case in which position information on the host vehicle is a predetermined coordinate.

11. A data ECU connected to a plurality of data ECUs and an autonomous driving ECU through a first network and through a second network having a communication bandwidth that is narrower than a communication bandwidth of the first network, the data ECU comprising:

a first communication interface connected with the autonomous driving ECU through the first network;

a second communication interface connected with the autonomous driving ECU through the second network; and a processor programmed to:
construct first autonomous driving data which is used in autonomous control of a host vehicle by the autonomous driving ECU,
transmit the constructed first autonomous driving data to the autonomous driving ECU via the first communication interface and the first network,
in a case in which a predetermined event occurs, construct second autonomous driving data which is used in autonomous control of the host vehicle by the autonomous driving ECU and transmit the constructed second autonomous driving data to the autonomous driving ECU via the second communication interface and the second network,
wherein, in a case where the first autonomous driving data is first sensor data, a range of second sensor data related to objects around the host vehicle included in the second autonomous driving data is reduced with respect to a range of the first sensor data related to objects around the host vehicle included in the first autonomous driving data,
wherein, in a case where the first autonomous driving data is map data, a map size of a map included in the second autonomous driving data is reduced with respect to a map size of a map included in the first autonomous driving data,
wherein the autonomous driving ECU is further programmed to determine a release point at which the autonomous control of the host vehicle is not able to be performed, and
wherein the map included in the second autonomous driving data includes the release point and the map included in the first autonomous driving data does not include the release point.

12. An autonomous driving ECU connected to a plurality of data ECUs through a first network and through a second network having a communication bandwidth that is narrower than a communication bandwidth of the first network, the autonomous driving ECU comprising:
a first communication interface connected with the plurality of data ECUs via the first network;
a second communication interface connected with the plurality of data ECUs via the second network; and
a processor programmed to:
receive first autonomous driving data from the plurality of data ECUs via the first communication interface and the first network,
perform autonomous control of a host vehicle on the basis of the first autonomous driving data received from the plurality of data ECUs,
in a case in which a predetermined event occurs, transmit a demand autonomous driving data request via the second communication interface and the second network, receive second autonomous driving data from one or more data ECUs among the plurality of data ECUs via the second communication interface and the second network, and perform autonomous control of the host vehicle on the basis of the second autonomous driving data received from the one or more data ECUs,
wherein, in a case where the first autonomous driving data is first sensor data, a range of second sensor data related to objects around the host vehicle included in the second autonomous driving data is reduced with respect to a range of the first sensor data related to objects around the host vehicle included in the first autonomous driving data,
wherein, in a case where the first autonomous driving data is map data, a map size of a map included in the second autonomous driving data is reduced with respect to a map size of a map included in the first autonomous driving data,
wherein the autonomous driving ECU is further programmed to determine a release point at which the autonomous control of the host vehicle is not able to be performed, and
wherein the map included in the second autonomous driving data includes the release point and the map included in the first autonomous driving data does not include the release point.

13. The autonomous driving ECU according to claim 12, wherein the one or more data ECUs are further programmed to reduce the range of the second sensor data related to objects around the host vehicle included in the second autonomous driving data according to a driving situation of the host vehicle.

* * * * *